(12) United States Patent
Hasfar et al.

(10) Patent No.: US 9,323,467 B2
(45) Date of Patent: Apr. 26, 2016

(54) DATA STORAGE DEVICE STARTUP

(71) Applicant: Western Digital Technologies, Inc., Irvine, CA (US)

(72) Inventors: Zaihas Amri Fahdzan Hasfar, Selangor (MY); Choo-Bhin Ong, Foothill Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 66 days.

(21) Appl. No.: 14/105,696

(22) Filed: Dec. 13, 2013

(65) Prior Publication Data

US 2015/0120995 A1 Apr. 30, 2015

Related U.S. Application Data

(60) Provisional application No. 61/897,038, filed on Oct. 29, 2013.

(51) Int. Cl.
*G06F 12/00* (2006.01)
*G06F 3/06* (2006.01)

(52) U.S. Cl.
CPC ............ *G06F 3/0632* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,333,138 A | 7/1994 | Richards et al. | |
| 5,581,785 A | 12/1996 | Nakamura et al. | |
| 5,586,291 A | 12/1996 | Lasker et al. | |
| 5,758,189 A * | 5/1998 | Nakada et al. | 710/46 |
| 6,044,439 A | 3/2000 | Ballard et al. | |
| 6,115,200 A | 9/2000 | Allen et al. | |
| 6,212,605 B1 * | 4/2001 | Arimilli et al. | 711/133 |
| 6,275,949 B1 | 8/2001 | Watanabe | |
| 6,429,990 B2 | 8/2002 | Serrano et al. | |
| 6,661,591 B1 | 12/2003 | Rothberg | |
| 6,662,267 B2 | 12/2003 | Stewart | |
| 6,687,850 B1 | 2/2004 | Rothberg | |
| 6,754,021 B2 | 6/2004 | Kisaka et al. | |
| 6,807,630 B2 | 10/2004 | Lay et al. | |
| 6,856,556 B1 | 2/2005 | Hajeck | |
| 6,909,574 B2 | 6/2005 | Aikawa et al. | |
| 6,968,450 B1 | 11/2005 | Rothberg et al. | |
| 7,017,037 B2 | 3/2006 | Fortin et al. | |
| 7,028,174 B1 | 4/2006 | Atai-Azimi et al. | |
| 7,082,494 B1 | 7/2006 | Thelin et al. | |
| 7,107,444 B2 | 9/2006 | Fortin et al. | |
| 7,120,806 B1 | 10/2006 | Codilian et al. | |
| 7,126,857 B2 | 10/2006 | Hajeck | |
| 7,142,385 B2 | 11/2006 | Shimotono et al. | |
| 7,334,082 B2 | 2/2008 | Grover et al. | |

(Continued)

OTHER PUBLICATIONS

International Search Report and Written Opinion dated Jan. 26, 2015 from related PCT Serial No. PCT/US2014/062996, 17 pages.

(Continued)

*Primary Examiner* — Baboucarr Faal

(57) ABSTRACT

When a read command is received from a host requesting data stored on a disk of a Data Storage Device (DSD), it is determined whether the DSD is in a startup period and whether the requested data is stored in a solid state memory of the DSD. The requested data is designated for storage in the solid state memory if it is determined that the DSD is in the startup period and the requested data is not stored in the solid state memory.

22 Claims, 5 Drawing Sheets

(56) References Cited

U.S. PATENT DOCUMENTS

| | | | |
|---|---|---|---|
| 7,395,452 B2 | 7/2008 | Nicholson et al. |
| 7,411,757 B2 | 8/2008 | Chu et al. |
| 7,430,136 B2 | 9/2008 | Merry, Jr. et al. |
| 7,447,807 B1 | 11/2008 | Merry et al. |
| 7,461,202 B2 | 12/2008 | Forrer, Jr. et al. |
| 7,472,222 B2 | 12/2008 | Auerbach et al. |
| 7,477,477 B2 | 1/2009 | Maruchi et al. |
| 7,502,256 B2 | 3/2009 | Merry, Jr. et al. |
| 7,509,441 B1 | 3/2009 | Merry et al. |
| 7,509,471 B2 | 3/2009 | Gorobets |
| 7,516,346 B2 | 4/2009 | Pinheiro et al. |
| 7,596,643 B2 | 9/2009 | Merry, Jr. et al. |
| 7,610,438 B2 | 10/2009 | Lee et al. |
| 7,613,876 B2 | 11/2009 | Bruce et al. |
| 7,644,231 B2 | 1/2010 | Recio et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,360 B1 | 3/2010 | Brunnett et al. |
| 7,685,374 B2 | 3/2010 | Diggs et al. |
| 7,733,712 B1 | 6/2010 | Walston et al. |
| 7,752,491 B1 | 7/2010 | Liikanen et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,315,006 B1 | 11/2012 | Chahwan et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,504,771 B2 | 8/2013 | Dawkins |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 8,825,976 B1 | 9/2014 | Jones |
| 8,917,471 B1 | 12/2014 | Hasfar et al. |
| 9,207,947 B1 * | 12/2015 | Murphy ............... G06F 9/4401 |
| 2002/0083264 A1 | 6/2002 | Coulson |
| 2006/0080501 A1 | 4/2006 | Auerbach et al. |
| 2006/0108875 A1 * | 5/2006 | Grundmann et al. ........... 307/70 |
| 2006/0195657 A1 | 8/2006 | Tien et al. |
| 2006/0248387 A1 | 11/2006 | Nicholson et al. |
| 2007/0028040 A1 | 2/2007 | Sinclair |
| 2008/0005462 A1 | 1/2008 | Pyeon et al. |
| 2008/0040537 A1 | 2/2008 | Kim |
| 2008/0059694 A1 * | 3/2008 | Lee ...................... G06F 3/0625 |
| | | 711/103 |
| 2008/0130156 A1 | 6/2008 | Chu et al. |
| 2008/0177938 A1 | 7/2008 | Yu |
| 2008/0222353 A1 | 9/2008 | Nam et al. |
| 2008/0256287 A1 | 10/2008 | Lee et al. |
| 2008/0307270 A1 | 12/2008 | Li |
| 2009/0031072 A1 | 1/2009 | Sartore |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172324 A1 | 7/2009 | Han et al. |
| 2009/0271562 A1 | 10/2009 | Sinclair |
| 2009/0327603 A1 | 12/2009 | McKean et al. |
| 2009/0327608 A1 | 12/2009 | Eschmann et al. |
| 2010/0088459 A1 | 4/2010 | Arya et al. |
| 2010/0174849 A1 | 7/2010 | Walston et al. |
| 2010/0199036 A1 | 8/2010 | Siewert et al. |
| 2010/0250793 A1 | 9/2010 | Syu |
| 2010/0306288 A1 | 12/2010 | Stein et al. |
| 2011/0010514 A1 | 1/2011 | Benhase et al. |
| 2011/0099323 A1 | 4/2011 | Syu |
| 2011/0138106 A1 | 6/2011 | Prabhakaran et al. |
| 2011/0145489 A1 | 6/2011 | Yu et al. |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0212325 A1 | 8/2013 | Hashimoto |
| 2013/0290793 A1 | 10/2013 | Booth et al. |
| 2014/0059405 A1 | 2/2014 | Syu et al. |
| 2014/0067139 A1 * | 3/2014 | Berke et al. ................... 700/291 |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009.sub.--papers/Payer.pdf, pp. 1-8.

Gokul Soundararajan, Vijayan Prabhakaran, Mahesh Balakrishan, Ted Wobber, "Extending SSD Lifetimes with Disk-Based Write

(56) References Cited

OTHER PUBLICATIONS

Caches", http://research.microsoft.com/pubs/115352/hybrid.pdf, Feb. 2010, pp. 1-14.

Xiaojian Wu, A. L. Narasimha Reddy, "Managing Storage Space in a Flash and Disk Hybrid Storage System", http://www.ee.tamu.edu/.about.reddy/papers/mascots09.pdf, pp. 1-4.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008, pp. 1-12.

Non-Volatile Memory Host Controller Interface revision 1.0 specification available for download at http://www.intel.com/standards/nvmhci/index.htm. Ratified on Apr. 14, 2008, 65 pages.

Obr, Nathan, "ACS Coordinating Device Maintenance," Microsoft, Jun. 8, 2010, 6 pages.

Alain Chahwan, U.S. Appl. No. 12/720,568, filed Mar. 9, 2010, 22 pages.

"SATA31_TPR_D145_201200419_V08, Title: Hybrid Information Feature," Proposed Draft: Serial ATA International Organization, Version 8, Apr. 19, 2012, pp. 1-79.

\* cited by examiner

DATA STORAGE DEVICE STARTUP

CROSS-REFERENCE TO RELATED APPLICATION

This application claims the benefit of U.S. Provisional Application No. 61/897,038, filed on Oct. 29, 2013, which is hereby incorporated by reference in its entirety.

BACKGROUND

Data Storage Devices (DSDs) are often used to record data onto or to reproduce data from a storage media. Some DSDs include multiple types of storage media. In the case of a Solid State Hybrid Drive (SSHD), a solid state storage media such as a flash memory is used for storing data in addition to at least one rotating magnetic disk for storing data.

During startup of a computer system including a host and a DSD, the host typically accesses boot up data from the DSD such as certain Operating System (OS) data and BIOS data. This boot up data is often stored on a disk of the DSD which requires spinning the disk up to an operating speed to read the boot up data from the disk. In addition, spinning up the disk during the startup period can require additional power during the startup period which can be undesirable for a computer system relying on a battery power source.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Data Storage Device Overview

Figure 1:
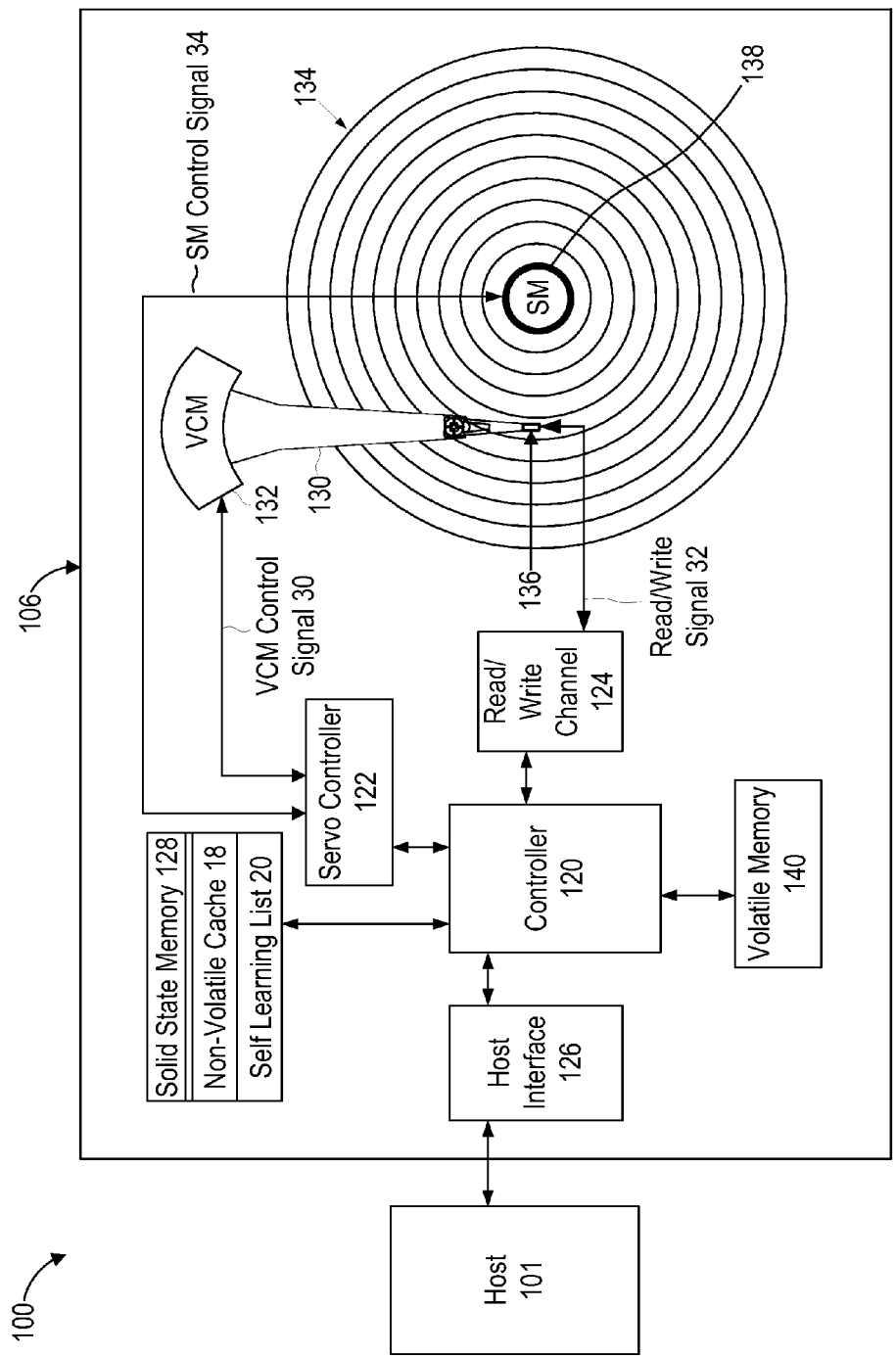
FIG. 1 is a block diagram depicting a Data Storage Device (DSD) according to an embodiment.

FIG. 1 shows computer system 100 according to an embodiment which includes host 101 and Data Storage Device (DSD) 106. Computer system 100 can be, for example, a computer system (e.g., desktop, mobile/laptop, tablet, smartphone, etc.) or other electronic device such as a digital video recorder (DVR). In this regard, computer system 100 may be a stand-alone system or part of a network.

In the example of FIG. 1, DSD 106 is a hybrid drive including two types of Non-Volatile Memory (NVM) media, i.e., rotating magnetic disks in disk pack 134 and solid state memory 128. While the description herein refers to solid state memory generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof.

DSD 106 includes controller 120 which includes circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a System on a Chip (SoC).

Host interface 126 is configured to interface DSD 106 with host 101 and may interface according to a standard such as, for example, PCI express (PCIe), Serial Advanced Technology Attachment (SATA), or Serial Attached SCSI (SAS). As will be appreciated by those of ordinary skill in the art, host interface 126 can be included as part of controller 120.

In the example of FIG. 1, disk pack 134 is rotated by Spindle Motor (SM) 138. DSD 106 also includes Head Stack Assembly (HSA) 136 connected to the distal end of actuator 130 which is rotated by Voice Coil Motor (VCM) 132 to position HSA 136 in relation to disk pack 134. Servo controller 122 includes circuitry to control the position of HSA 136 and the rotation of disk pack 134 using VCM control signal 30 and SM control signal 34, respectively.

Disk pack 134 comprises multiple disks that are radially aligned so as to rotate about SM 138. Each disk in disk pack 134 includes a number of radial spaced, concentric tracks for storing data on a disk surface. HSA 136 includes multiple heads each arranged to read data from and write data to a corresponding surface of a disk in disk pack 134. Read/write channel 124 includes circuitry for encoding data to be written to disk pack 134 and for decoding data read from disk pack 134. As will be appreciated by those of ordinary skill in the art, read/write channel 124 can be included as part of controller 120.

DSD 106 also includes solid state memory 128 for storing data. Solid state memory 128 stores Non-Volatile Cache (NVC) 18 where data can be retained across power cycles (i.e., after turning DSD 106 off and on). NVC 18 can be used to store data which may or may not also be stored in disk pack 134. Solid state memory 128 also stores self learning list 20. As discussed in more detail below with reference to FIG. 2, self learning list 20 can be used as part of a self learning process of DSD 106 to track data that is used across a plurality of startups of DSD 106.

Volatile memory 140 can include, for example, a Dynamic Random Access Memory (DRAM) which can be used by DSD 106 to temporarily store data. Data stored in volatile memory 140 can include data read from NVM (e.g., disk pack 134 or solid state memory 128), data to be written to NVM, instructions loaded from a firmware of DSD 106 for execution by controller 120, and/or data used in executing the firmware of DSD 106.

In operation, host interface 126 receives read and write commands from host 101 via host interface 126 for reading data from and writing data to NVM such as solid state memory 128 and disk pack 134. In response to a write command from host 101, controller 120 may buffer the data to be written for the write command in volatile memory 140.

For data to be written to disk pack 134, read/write channel 124 can encode the buffered data into write signal 32 which is provided to HSA 136 for magnetically writing data to a disk surface of disk pack 134.

In response to a read command for data stored on a disk surface of disk pack 134, controller 120 positions HSA 136 via servo controller 122 to magnetically read the data stored on a surface of disk pack 134. HSA 136 sends the read data as read signal 32 to read/write channel 124 for decoding and the data is buffered in volatile memory 140 for transferring to host 101.

The foregoing operation of disk pack 134 for servicing read and write commands generally requires more power than using solid state memory 128 since disk pack 134 needs to be physically spun up to an operating speed by SM 138 before reading or writing data on disk pack 134.

Accordingly, NVC 18 can store a copy of certain data stored on disk pack 134 to prevent disk pack 134 from having to spin up. Such data can include frequently accessed data or data used to boot up or startup computer system 100 or DSD 106. For example, to startup DSD 106 or computer system 100 without having to spin up disk pack 134, NVC 18 can include data such as a firmware for DSD 106, certain Operating System (OS) data, or BIOS boot data. Upon power up of DSD 106, controller 120 can load this data from NVC 18 and be ready to receive commands from host 101 without having to spin up disk pack 134. This arrangement ordinarily allows for a quicker ready time for computer system 100 and can allow DSD 106 to keep SM 138 powered down, in addition to other components used for the operation of disk pack 134 such as servo controller 122 and read/write channel 124. Reducing the power needed to startup DSD 106 can be especially beneficial when computer system 100 must rely on a battery with a low charge.

In some implementations, the "spin-less drive boot" generally described above and in more detail below can serve as part of a "High Spindle Suppression" (HSS) mode to reduce instances of rotation of SM 138 during the HSS mode. In such implementations, the DSD 106 is considered to be in the HSS mode during startup. Examples of an HSS mode can be found in co-pending application Ser. No. 14/105,603, entitled "Power Management for Data Storage Device", filed on Dec. 13, 2013, which is hereby incorporated by reference in its entirety.

Example Self Learning List

Figure 2:
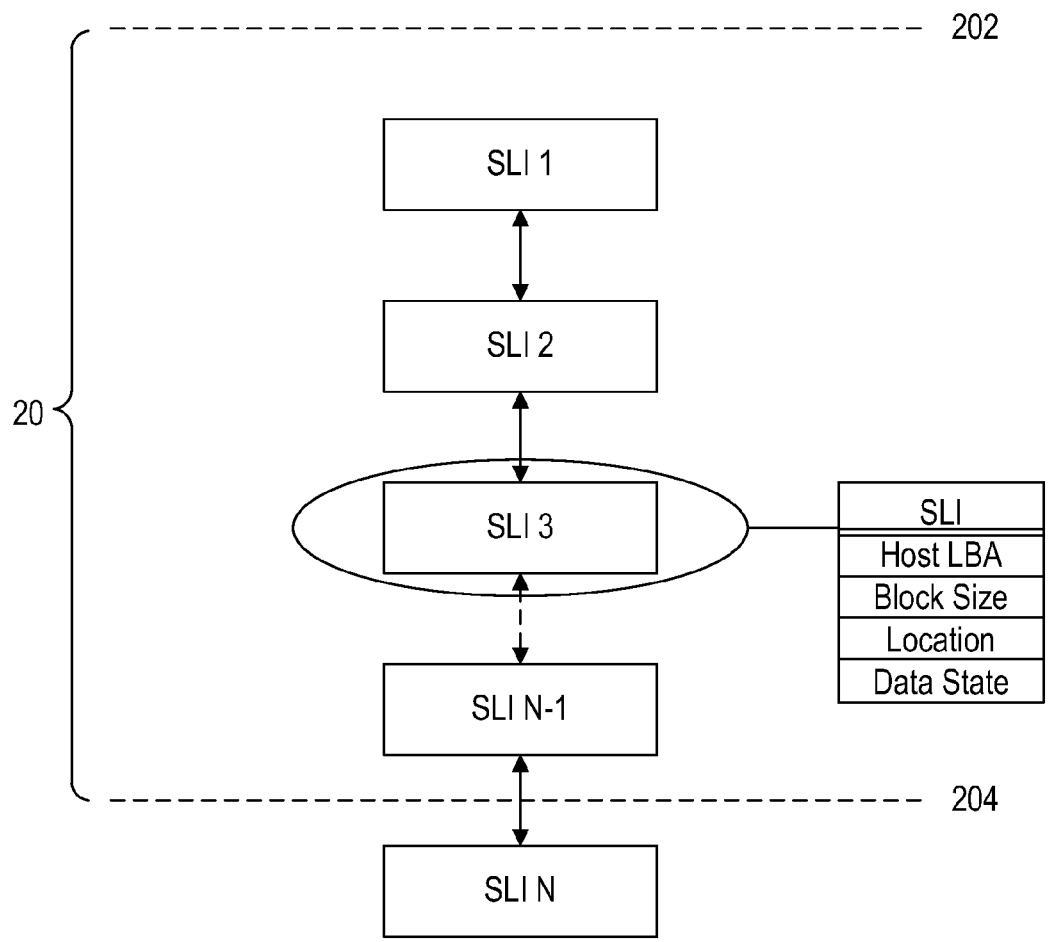
FIG. 2 is a conceptual diagram illustrating a self learning list according to an embodiment.

FIG. 2 is a conceptual diagram illustrating self learning list 20 according to an embodiment where self learning list 20 is used to track boot up data used across a plurality of startup periods. As shown in FIG. 2, self learning list 20 includes self learning information labeled as SLI 1 to SLI N-1 between the start of the list at 202 and the end of the list at 204. In the embodiment of FIG. 2, self learning list 20 is a doubly linked list where each self learning information entry SLI 1 to SLI N-1 is associated with data read or written during a startup period of DSD 106.

Self learning list 20 can be part of a Least Recently Used (LRU) algorithm to keep a fixed amount of self learning information between the start of the list at 202 and the end of the list at 204. When read commands or write commands are received during a startup period of DSD 106, controller 120 inserts or reinserts self learning information associated with the read or write command at the start of the list at 202. The older self learning information in the list is then pushed down toward the end of the list at 204. In this way, the most recently used data is retained in the list while the least recently used data can be removed from the list, as is the case for SLI N in FIG. 2. Controller 120 may then mark the data corresponding to the removed self learning information as invalid in NVC 18, assuming a copy of the data already exists in disk pack 134. In other implementations, controller 120 may delete from NVC 18 the data corresponding to the removed self learning information. In addition, and as described below in more detail with reference to FIG. 3, data not stored in NVC 18 that has associated self learning information in self learning list 20 is designated for copying to NVC 18.

Each instance of self learning information is associated with data read or written during a startup period of DSD 106. As shown for SLI 3, the self learning information can include a host Logical Block Address (LBA), a block size, location information, and data state information. The host LBA indicates a logical address used by host 101 for the data associated with the read or write command. In the case of a read command, the host LBA is for data requested by the host. For a write command, the host LBA is for data to be written. The block size indicates a data capacity size that can be allocated for the data in solid state memory 128, such as 4 KB or 8 KB. The location information can indicate a location for the data in solid state memory 128, such as a block or page address. The data state information can indicate whether the data is currently stored in only disk pack 134, only in solid state memory 128, or stored in both disk pack 134 and solid state memory 128 (i.e., synced on both media). Other embodiments may only include some of the above examples of self learning information, such as only including a host LBA for data read or written during a startup period.

By maintaining self learning list 20, it is ordinarily possible to account for changes in the boot up data used over a plurality of startup periods. Such changes may result, for example, from updates to an OS or from other changes in computer system 100. Self learning list 20 can therefore allow the data associated with a startup period to evolve over time to more accurately predict the data that will be accessed during the next startup period.

Example Self Learning Process

Figure 3:
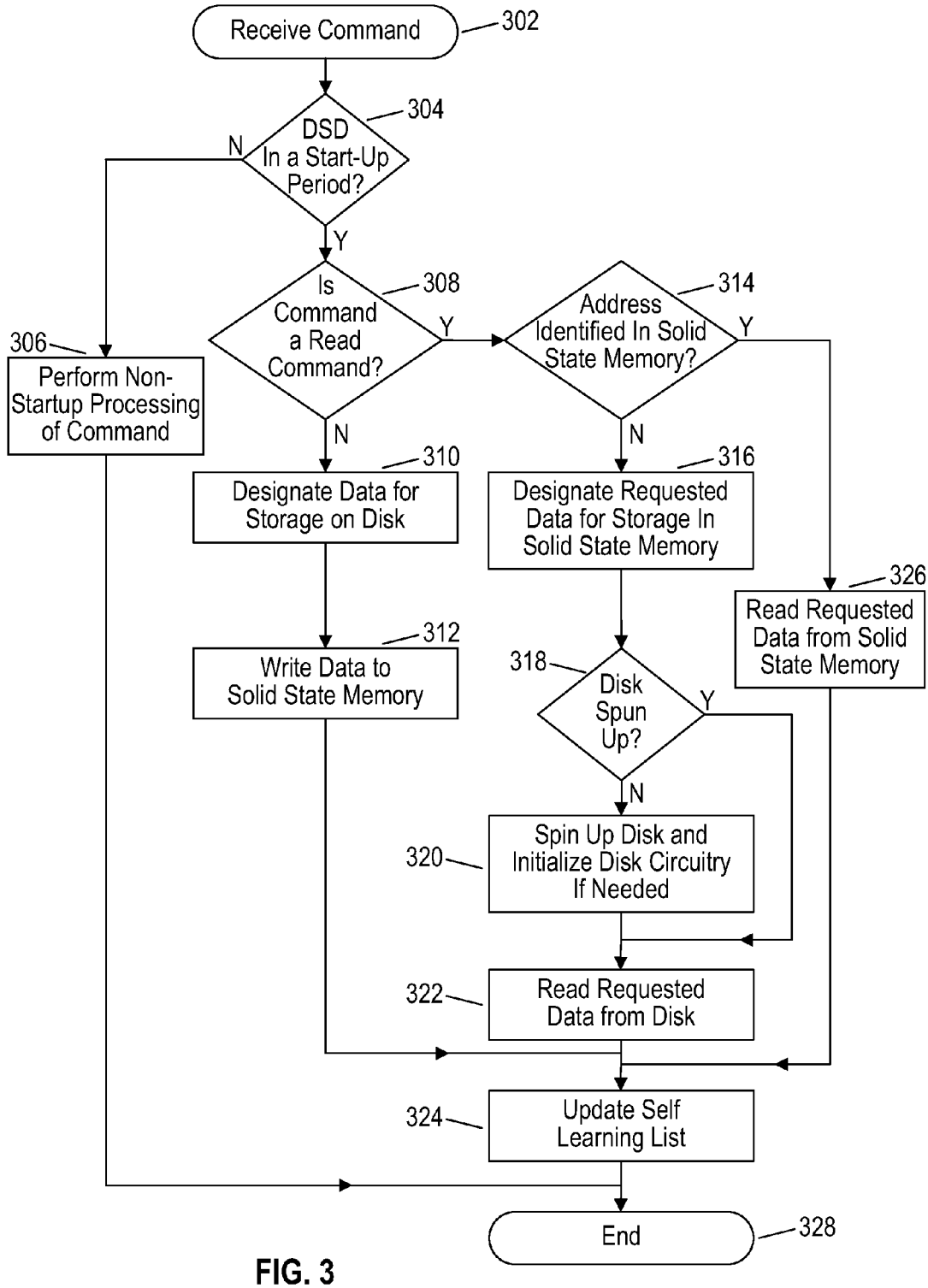
FIG. 3 is a flowchart for a self learning process according to an embodiment.

FIG. 3 is a flowchart for a self learning process that can be performed by controller 120 according to an embodiment. The process begins in block 302 when DSD 106 receives a read or write command from host 101 via host interface 126.

In block 304, controller 120 determines whether DSD 106 is in a startup period. Controller 120 may make this determination based on an indication received from host 101. For example, controller 120 may check in block 304 whether host 101 has issued a particular command or query indicating that an OS executing on host 101 has finished booting. In other implementations, controller 120 may use the amount of data transferred between DSD 106 and host 101 since startup to determine whether DSD 106 is in the startup period. For example, controller 120 may determine that DSD 106 is in the startup period if less than 200 MB of data have been transferred between DSD 106 and host 101 since startup. The determination in block 304 may also be made based upon a predetermined amount of time such as 30 seconds such that controller 120 determines that DSD 106 is in the startup period if it has been less than 30 seconds since startup.

In some embodiments, controller 120 may use a combination of the above indicators in block 304 to determine whether DSD 106 is in a startup period. For example, controller 120 may determine that DSD 106 is in a startup period if any one of the above conditions occur, i.e., if either an indication has been received from host 101, a predetermined amount of data has been transferred, or a predetermined amount of time has elapsed.

If controller 120 determines in block 304 that DSD 106 is not in a startup period, the command received in block 302 is processed normally without self learning. On the other hand, if controller 120 determines in block 304 that DSD 106 is in a startup period, controller 120 determines in block 308 whether the command received in block 302 is a read command or a write command. If the command is not a read command (i.e., the command is a write command), controller 120 in block 310 designates the data associated with the write command for later storage in disk pack 134. This data may be referred to as "dirty data" which is data that needs to be synchronized with disk pack 134 since the data will only initially be stored in solid state memory 128 in block 312. The designation of the dirty data may be made by marking an LBA for the dirty data in a list of LBAs for data to be copied to disk pack 134. The designation of block 310 may also be made by using data state information of the self learning information discussed above to indicate that the designated data is only stored in solid state memory 128. The copying to disk pack 134 can be done, for example, as part of a background activity when DSD 106 is not servicing any host commands. Such copying may be performed as part of a synchronization process such as the synchronization process of FIG. 5 described below. Although the present embodiment provides for a later backup of boot data, other embodiments may omit block 310 where only one copy of the boot data is desired.

In block 312, the data for the write command is written to NVC 18 in solid state memory 128. As part of writing the data to solid state memory 128, controller 120 may first check that there is enough available storage capacity in solid state memory 128 to write the data. In some embodiments, if there is not enough storage capacity, controller 120 may instead write the data to disk pack 134.

As discussed above, the data written during a startup period can be stored in solid state memory 128 instead of disk pack 134 to improve the accessibility of data during a subsequent startup period since disk pack 134 will not need to be spun up to access the data. In addition, the power required to access the data written in block 312 during a startup period should be reduced since it will not be necessary to spin up disk pack 134 or power certain components of DSD 106 for operation of disk pack 134.

In block 324, controller 120 updates self learning list 20 to insert or reinsert self learning information at the start of the list for the data written in block 312. The process then ends in block 328.

If it is determined in block 308 that the command is a read command, controller 120 determines in block 314 whether the address for the data requested by the read command is identified in solid state memory 128 (i.e., a cache hit). If so, the requested data is read from solid state memory 128 in block 326 and self learning list 20 is updated in block 324 by inserting or reinserting self learning information at the start of the list for the data read in block 326.

If the address for the requested data is not identified in solid state memory 128 in block 314 (i.e., a cache miss), controller 120 in block 316 designates the requested data for storage in solid state memory 128. The designation in block 316 can allow controller 120 to later copy the requested data to solid state memory 128 for future start up periods. The copying can be done, for example, as part of a background activity when DSD 106 is not servicing any host commands. Such copying may be performed as part of a synchronization process such as the synchronization process of FIG. 5 described below.

The designation in block 316 may be made by marking an LBA associated with the requested data in a list of data to be copied from disk pack 134 to solid state memory 128. The designation may also be made with the use of self learning information in self learning list 20. For example, data state information of the self learning information may indicate that the data is only stored in disk pack 134 and therefore needs to be copied from disk pack 134 to NVC 18 while the self learning information remains in self learning list 20.

Controller 120 checks in block 318 whether disk pack 134 is spun up. If so, the requested data is read from disk pack 134 in block 322.

If disk pack 134 is not already spun up in block 318, controller 120 controls SM 138 in block 320 to spin up disk pack 134 to read the requested data. Controller 120 may also need to initialize or power up certain circuitry such as read/write channel 124 or servo controller 122 if it is not ready to perform a read operation on disk pack 134. The requested data is read from disk pack 134 in block 322 and the self learning list is updated in block 324 by inserting or reinserting self learning information for the requested data read in block 322. The self learning process of FIG. 3 then ends in block 328.

Example Data Eviction Process

Figure 4:
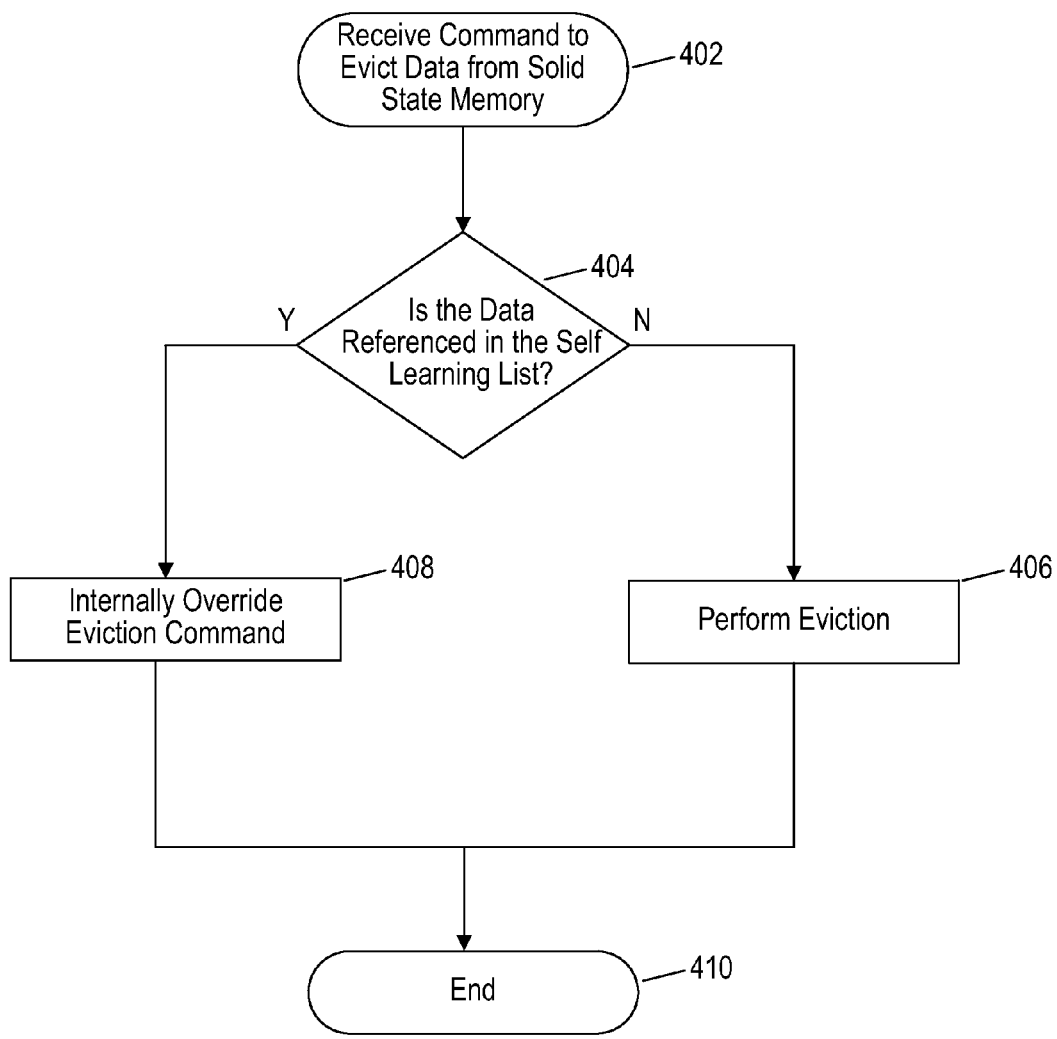
FIG. 4 is a flowchart for a data eviction process according to an embodiment.

FIG. 4 is a flowchart for a data eviction process that can be performed by controller 120 according to an embodiment. In block 402, DSD 106 receives a command from host 101 to evict certain data from solid state memory 128. In this regard, the eviction of data can include moving the data from solid state memory 128 to disk pack 134, deleting the data from solid state memory 128, and/or marking the data as invalid in solid state memory 128.

In block 404, controller 120 determines whether the data to be evicted is referenced in self learning list 20. This determination may be made by comparing the LBAs of the data to be evicted with the LBAs in the self learning information of self learning list 20.

If the data is referenced in self learning list 20, this means that the data to be evicted has recently been used during a startup period of DSD 106 and should not be evicted from solid state memory 128 since it will likely be needed during a future startup of DSD 106.

Accordingly, if it is determined in block 404 that the data to be evicted is referenced in self learning list 20, controller 120 internally overrides the eviction command in block 408 so that the data remains in solid state memory 128 despite the command to evict the data. The override of the eviction command can be transparent to host 101. In other embodiments, DSD 106 may provide host 101 with a notification that the data cannot be evicted.

If controller 120 determines in block 404 that the data is not referenced in self learning list 20, controller 120 performs the eviction of the data in block 406 since the data will not likely be needed in a future startup period. The eviction process of FIG. 4 then ends in block 410.

By checking whether data to be evicted is referenced in self learning list 20 before evicting the data from solid state memory 128, it is ordinarily possible to reduce the likelihood that disk pack 134 will need to be spun up to access the evicted data during a startup period.

Example Synchronization Process

Figure 5:
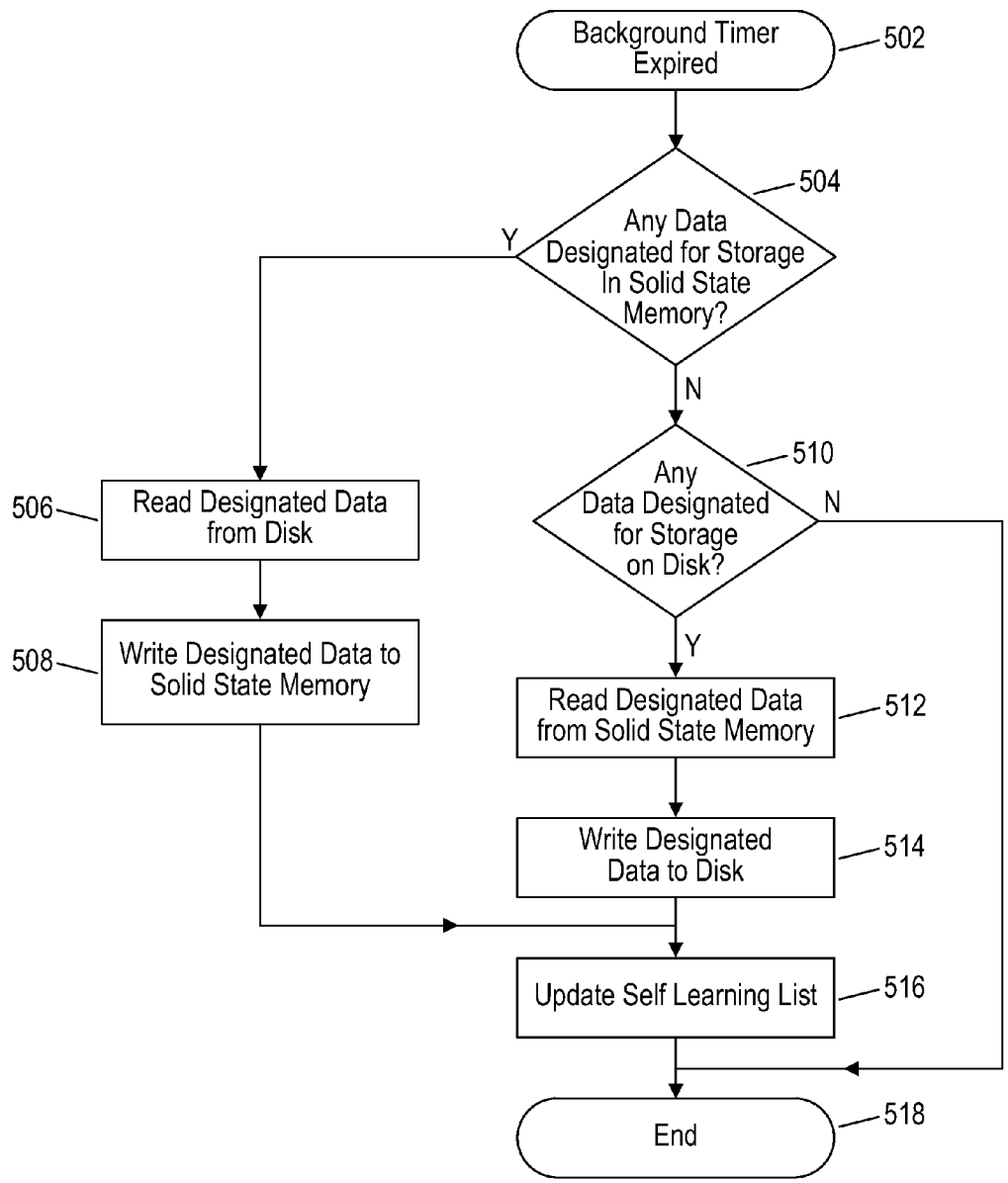
FIG. 5 is a flowchart for a media synchronization process according to an embodiment.

FIG. 5 is a flowchart for a synchronization process that can be performed by controller 120 according to an embodiment. The synchronization process of FIG. 5 can be performed as a background activity after a startup period to have data used for startup stored in both disk pack 134 and solid state memory 128.

The synchronization process starts in block 502 when a background timer expires indicating that no host commands have been received for a predetermined period of time. In block 504, controller 120 determines whether there is any data designated for storage in solid state memory 128. Such data may have been designated for storage in solid state memory 128 as a result of the data not being previously available from solid state memory 128 during a startup (e.g., the designation in block 316 of FIG. 3).

If there is data designated for storage in solid state memory 128, controller 120 in block 506 reads the designated data from disk pack 134 and writes the designated data to NVC 18 in block 508.

If there is no designated data in block 504, controller 120 in block 510 determines whether there is any data designated for copying from solid state memory 128 to disk pack 134. If not, the synchronization process ends in block 518.

If controller 120 determines in block 510 that there is data designated for storage in disk pack 134, the designated data is read from solid state memory 128 in block 512 and the designated data is written to disk pack 134 in block 514. As part of writing the data to solid state memory 128, controller 120 may first check that there is enough available storage capacity in solid state memory 128 to write the data.

Self learning list 20 is updated in block 516 to reflect the current data state of the designated data being stored in both disk pack 134 and solid state memory 128 after writing the designated data in either block 508 or 514. The synchronization process of FIG. 5 then ends in block 518.

By storing startup or boot data in solid state memory 128, it is ordinarily possible to reduce the power consumed by DSD 106 during the startup period and improve the time to ready for DSD 106. Furthermore, the self learning processes disclosed above allow DSD 106 to adapt to changes in startup over time by updating the data it stores in NVC 18.

The following tables illustrate test results showing improvements for the time to transition from BIOS to an OS after startup, the time for the OS User Interface (UI) to become available after startup, and the power consumption as more startup data is stored in solid state memory in accordance with the present disclosure.

TABLE 1

| Run | Transition Time to OS (ms) | OS UI Availability (sec) | Spindle State |
|---|---|---|---|
| 1 | 3,433 | 9.081 | Spinning |
| 2 | 3,170 | 8.881 | Spinning |
| 3 | 1,114 | 8.617 | Spinning |
| 4 | 1,106 | 8.350 | Spinning |
| 5 | 1,113 | 8.566 | Spinning |
| 6 | 1,113 | 8.342 | Spinning |
| 7 | 1,114 | 8.159 | Spinning |
| 8 | 1,113 | 6.557 | Not Spinning |
| 9 | 1,113 | 6.311 | Not Spinning |

Table 1 above shows several performance measurements across 9 consecutive startup periods for a DSD implementing the processes of FIGS. 3 and 5. The performance measurements of Table 1 include how quickly after startup the host is able to complete execution of the BIOS and transition to execution of the OS in the Transition Time to OS column. The OS UI Availability column indicates the time for the OS UI to become available after startup, and the Spindle State column indicates whether or not the spindle for the disk pack is spinning during the startup period.

As shown above, both the transition time to the OS and the time for the OS UI to become available decreased over the 9 runs. The transition time to the OS decreased by 2,320 ms or about 67%. The time for the OS UI to become available decreased by 2.77 seconds or about 30%. In addition, less power was used in runs 8 and 9 since it was no longer necessary to spin the disk pack to access data during the startup period. However, even with the disk pack still spinning in runs 2 to 7, both the transition time to the OS and the OS UI availability improved from the initial run due to more startup data being stored in the solid state memory.

Table 2 below further illustrates the power savings of the foregoing processes.

TABLE 2

| Condition | Spindle State | Average Power (mW) |
|---|---|---|
| 0% Data Stored | Spinning | 3,071 |
| 50% Data Stored | Spinning | 2,841 |
| 100% Data Stored | Not Spinning | 2,772 |

As shown in Table 2 above, as more data is stored or cached in solid state memory, less power is used since fewer operations are performed on the disk pack. By the time all of the startup data is stored or cached in solid state memory, the disk pack no longer needs to be spun up and the average power during the startup period has been reduced by 299 mW or about 9.7%.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage device (DSD), comprising:
    a disk for storing data;
    a solid state memory including a non-volatile cache for storing data; and
    a controller configured to:
        receive a write command from a host to store data in the DSD;
        determine whether the DSD is in a startup period of the DSD, wherein the host accesses boot up data from the DSD during the startup period; and
        if it is determined that the DSD is in a startup period:
            store the data for the write command in the non-volatile cache of the solid state memory;
            update a list to include an entry for the data for the write command, the list including entries indicating data written during a plurality of startup periods of the DSD; and
            use the list to determine whether to invalidate or delete the data for the write command in the non-volatile cache.

2. The DSD of claim 1, wherein the controller is further configured to
    designate the data for the write command for later storage on the disk.

3. The DSD of claim 1, wherein the controller is further configured to determine whether the DSD is in the startup period based on an indication received from the host.

4. The DSD of claim 3, wherein the indication received from the host indicates that an operating system executing on the host has finished booting.

5. The DSD of claim 1, wherein the controller is further configured to determine whether the DSD is in the startup period based on at least one of an amount of time since a startup of the DSD and an amount of data transferred between the DSD and the host since the startup of the DSD.

6. The DSD of claim 1, wherein the list includes entries indicating data read during the plurality of startup periods.

7. The DSD of claim 6, wherein the controller is further configured to move an entry to a beginning of the list when a read command or a write command is received from the host during a startup period.

8. The DSD of claim 6, wherein the controller is further configured to:
    remove an entry from the list associated with least recently used data over the plurality of startup periods; and
    delete the least recently used data from the solid state memory or mark the least recently used data as invalid in the solid state memory.

9. The DSD of claim 6, wherein an entry in the list includes at least one of a logical address, a block size, and a physical address for data read or written during a startup period of the plurality of startup periods.

10. The DSD of claim 6, wherein an entry in the list includes data state information indicating whether the data associated with the entry is stored only on the disk, only in the solid state memory, or stored in both the disk and the solid state memory.

11. The DSD of claim 6, wherein the controller is further configured to:
    receive a command to evict data from the solid state memory;
    determine whether the data to be evicted is referenced in the list; and
    override the command to evict the data if it is determined that the data is referenced in the list.

12. A method for operating a data storage device (DSD) including a solid state memory, the method comprising:
    receiving a write command from a host to store data in the DSD;
    determining whether the DSD is in a startup period, wherein the host accesses boot up data from the DSD during the startup period; and
    if it is determined that the DSD is in a startup period:
        storing the data for the write command in a non-volatile cache of the solid state memory;
        updating a list to include an entry for the data for the write command, the list including entries indicating data written during a plurality of startup periods of the DSD; and
        using the list to determine whether to invalidate or delete the data for the write command in the non-volatile cache.

13. The method of claim 12, further comprising
    designating the data for the write command for later storage on a disk of the DSD.

14. The method of claim 12, further comprising determining whether the DSD is in the startup period based on an indication received from the host.

15. The method of claim 14, wherein the indication received from the host indicates that an operating system executing on the host has finished booting.

16. The method of claim 12, further comprising determining whether the DSD is in the startup period based on at least one of an amount of time since a startup of the DSD and an amount of data transferred between the DSD and the host since the startup of the DSD.

17. The method of claim 12, wherein the list includes entries associated with data read during the plurality of startup periods.

18. The method of claim 17, further comprising moving an entry to a beginning of the list when a read command or a write command is received from the host during a startup period.

19. The method of claim 17, further comprising:
   removing an entry from the list associated with least recently used data over the plurality of startup periods; and
   deleting the least recently used data from the solid state memory or marking the least recently used data as invalid in the solid state memory.

20. The method of claim 17, wherein an entry in the list includes at least one of a logical address, a block size, and a physical address for data read or written during a startup period of the plurality of startup periods.

21. The method of claim 17, wherein an entry in the list includes data state information indicating whether the data associated with the entry is stored only on a disk of the DSD, only in the solid state memory, or stored in both the disk and the solid state memory.

22. The method of claim 17, further comprising:
   receiving a command to evict data from the solid state memory;
   determining whether the data to be evicted is referenced in the list; and
   overriding the command to evict the data if it is determined that the data is referenced in the list.

* * * * *